(12) United States Patent
Wang et al.

(10) Patent No.: US 10,104,037 B2
(45) Date of Patent: Oct. 16, 2018

(54) METHOD AND SYSTEM FOR NETWORK ACCESS REQUEST CONTROL

(71) Applicant: Alibaba Group Holding Limited, George Town, Grand Cayman (KY)

(72) Inventors: Tengchao Wang, Hangzhou (CN); Wei Zheng, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/242,311

(22) Filed: Aug. 19, 2016

(65) Prior Publication Data
US 2017/0063717 A1 Mar. 2, 2017

(30) Foreign Application Priority Data
Aug. 25, 2015 (CN) .......................... 2015 1 0526847

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 29/12 | (2006.01) |
| H04L 29/08 | (2006.01) |
| H04L 12/801 | (2013.01) |
| H04L 12/927 | (2013.01) |

(52) U.S. Cl.
CPC .......... *H04L 61/1511* (2013.01); *H04L 47/10* (2013.01); *H04L 47/80* (2013.01); *H04L 67/02* (2013.01); *H04L 67/101* (2013.01); *H04L 67/2838* (2013.01)

(58) Field of Classification Search
CPC ... H04L 47/801; H04L 47/2416; H04L 67/02; H04L 67/101; H04L 67/2338
See application file for complete search history.

(56) References Cited

U.S. PATENT DOCUMENTS

| 6,044,439 A | 3/2000 | Ballard |
| 6,976,258 B1 | 12/2005 | Goyal |
| 7,062,642 B1 | 6/2006 | Langrind |

(Continued)

*Primary Examiner* — Steve D Agosta
(74) *Attorney, Agent, or Firm* — Shun Yao; Park, Vaughan, Fleming & Dowler LLP

(57) ABSTRACT

Embodiments of the present application provide a method and system for network access request control. During operation, the system may identify a network access request received by a website. The system may determine a type of the network access request, and control the network access request according to the type of the network access request. The type of the network access request can be one of a user access request, a crawler access request, or an invalid access request. Based on the type of the network access request and/or the access requests overall compared to a cluster stability threshold, the system may take measures to throttle the access requests or otherwise adjust a throttling policy. The system may take measures such as demoting a service to a lower priority, rejecting execution of an access request, redirecting an access request to another service cluster, and expanding a physical layer of a service cluster.

18 Claims, 9 Drawing Sheets

(56) References Cited

U.S. PATENT DOCUMENTS

| | | |
|---|---|---|
| 7,457,870 B1 | 11/2008 | Lownsbrough |
| 7,617,314 B1 | 11/2009 | Bansod |
| 7,639,613 B1 | 12/2009 | Ghannadian |
| 9,612,758 B1 | 4/2017 | Liu |
| 2002/0161990 A1 | 10/2002 | Zhang |
| 2003/0135612 A1 | 7/2003 | Huntington |
| 2005/0052992 A1* | 3/2005 | Cloonan ............ H04L 41/5025 370/229 |
| 2005/0257222 A1 | 11/2005 | Davis |
| 2005/0268075 A1 | 12/2005 | Caprioli |
| 2006/0028999 A1 | 2/2006 | Iakobashvili |
| 2006/0143617 A1 | 6/2006 | Knauerhase |
| 2006/0288015 A1 | 12/2006 | Schirripa |
| 2007/0041331 A1 | 2/2007 | Ma |
| 2007/0276990 A1 | 11/2007 | Mosek |
| 2007/0283009 A1 | 12/2007 | Takemura |
| 2008/0216086 A1 | 9/2008 | Tanaka |
| 2008/0288661 A1 | 11/2008 | Galles |
| 2009/0144731 A1 | 6/2009 | Brown |
| 2009/0300210 A1 | 12/2009 | Ferris |
| 2009/0307396 A1 | 12/2009 | Nogueras |
| 2011/0106802 A1 | 5/2011 | Pinkney |
| 2011/0173251 A1 | 7/2011 | Sandhu |
| 2011/0265164 A1 | 10/2011 | Lucovsky |
| 2011/0276951 A1 | 11/2011 | Jain |
| 2011/0296488 A1 | 12/2011 | Dandekar |
| 2012/0084262 A1 | 4/2012 | Dwarampudi |
| 2012/0221611 A1 | 8/2012 | Watanabe |
| 2012/0239896 A1 | 9/2012 | Sobel |
| 2012/0324572 A1 | 12/2012 | Gordon |
| 2013/0055241 A1 | 2/2013 | De |
| 2013/0246619 A1 | 9/2013 | Raja |
| 2014/0019689 A1 | 1/2014 | Cain, III |
| 2014/0066101 A1 | 3/2014 | Lyman |
| 2014/0177497 A1 | 6/2014 | Backholm |
| 2014/0223427 A1 | 8/2014 | Bootland |
| 2015/0120914 A1 | 4/2015 | Wada |
| 2015/0150003 A1 | 5/2015 | Emelyanov |
| 2015/0169341 A1 | 6/2015 | Gulati |
| 2015/0181617 A1 | 6/2015 | Luna |
| 2015/0212919 A1 | 7/2015 | Srour |
| 2015/0215816 A1 | 7/2015 | Abou-Elkheir |
| 2015/0347262 A1 | 12/2015 | Vyas |
| 2016/0021211 A1 | 1/2016 | Yellin |
| 2016/0080229 A1 | 3/2016 | Kobayashi |
| 2016/0162320 A1 | 6/2016 | Singh |

\* cited by examiner

METHOD AND SYSTEM FOR NETWORK ACCESS REQUEST CONTROL

RELATED APPLICATION

Under 35 U.S.C. 119, this application claims the benefits and rights of priority of Chinese Patent Application No. 201510526847.8, filed 25 Aug. 2015.

BACKGROUND

Field

The present invention relates to Internet technology, and particularly relates to a method and system for network access request control.

Related Art

The architecture of a large e-commerce company is a complicated and distributed reticular structure, with daily traffic averaging at hundreds of millions of access requests, and the processing of each user request usually depends on tens or even hundreds of subsystems. To ensure the stability of the overall system, current approaches attempt to ensure the stability of each subsystem. However, different subsystems may lack a uniform process and apply their own respective methods to control their own access entries, exits and intermediate processes. As a result, when traffic increases, it becomes very difficult to ensure that all dependent subsystems are completely reliable. Furthermore, as this approach does not take into account the characteristics of distributed links, the protective measures of different subsystems can even cause conflicts between themselves. With respect to control measures, the current practice for managing burst traffic (such as when web crawlers collect data) is to limit overall traffic at entry. However, in actual practice, an entry application usually provides many services simultaneously (the most common case is that one application handles multiple Uniform Resource Locator (URL) requests). Each service has different capabilities, and this approach to controlling traffic flow has problems including that it cannot be directed, is non-uniform in implementation, with overly coarse granularity of control.

SUMMARY

One embodiment of the present disclosure provides a system for network assess request control. During operation, the system may identify a network access request received by a website. The system may determine a type of the network access request, and control the network access request according to the type of the network access request.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of controlling network access request traffic at a website by identifying the type of each network access request and processing each network access request according to the type of the network access request. Before describing a network access request control method for processing the different types of network access requests, the disclosure below first describes dividing network access requests into different types and dividing a distributed system into different layers.

The network access requests of a large electronic commerce website (hereinafter referred to as an "e-commerce website") can be divided according to their sources as general user access requests, crawler access requests and invalid access requests. User access requests are the lifeblood of an e-commerce website and refer to normal user requests. Crawler access requests refer to requests that various search engines initiate at irregular times in order to obtain information regarding an e-commerce website. The information collection activity of crawlers affects the ranking of the e-commerce website in search engines. Invalid access requests refer to non-user and non-crawler network access requests which are usually random activity and are of no significance to an e-commerce website.

An e-commerce website distributed system can be divided according to different functions into a physical layer, a domain name system (DNS) layer, a web server layer (including an open system interconnection (OSI) network model), a page application layer, and a service application layer. In particular, a large e-commerce website may be composed of a large amount of commercial logic and service logic, so there are typically numerous internal service applications for providing various functions, and the invocation relationships are complex.

Exemplary Network Access Request Control Method

Figure 1:
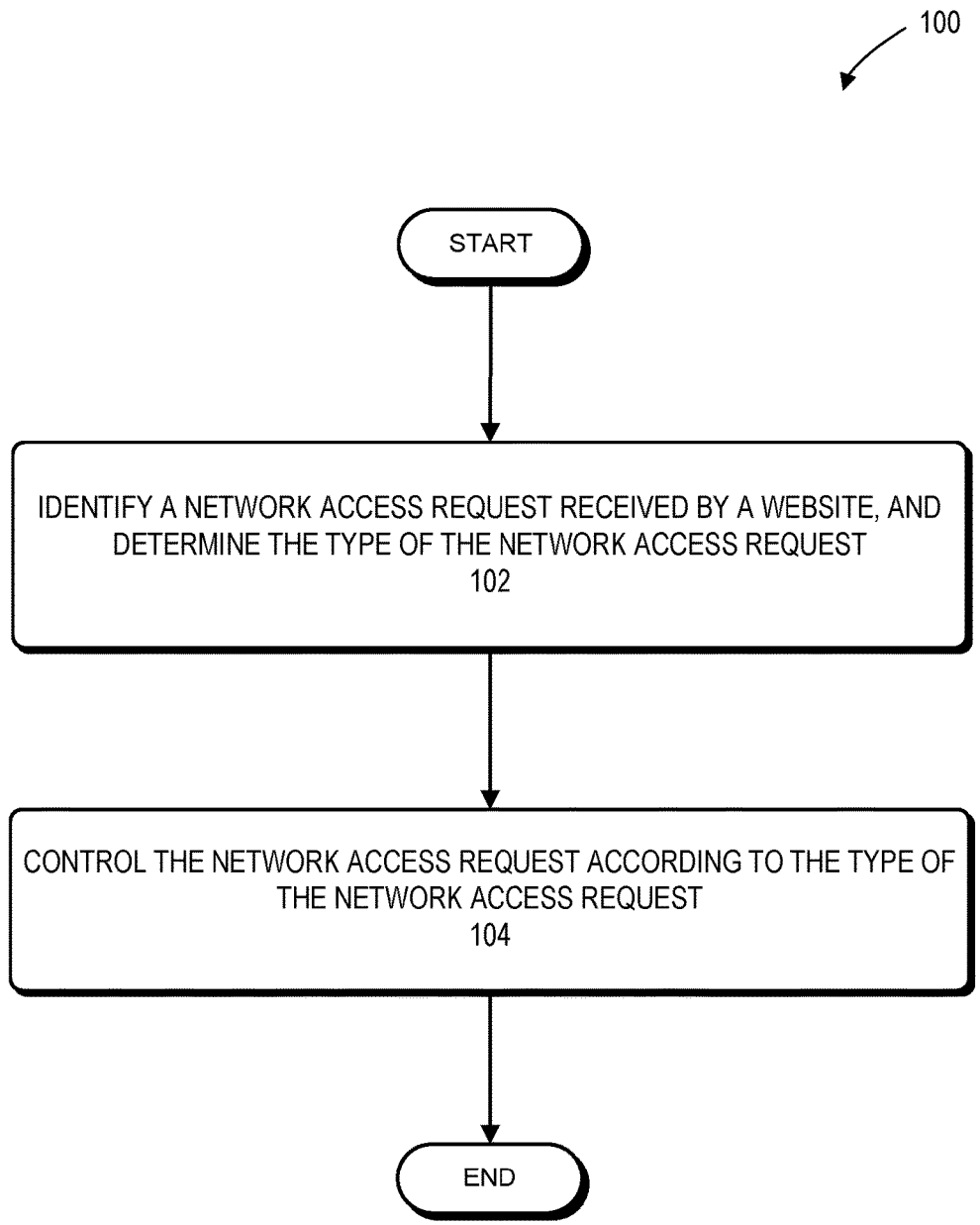
FIG. 1 presents a flowchart illustrating an exemplary network access request control method, in accordance with an embodiment of the present invention.

FIG. 1 presents a flowchart illustrating an exemplary network access request control method 100, in accordance with an embodiment of the present invention. During operation, the system may identify a network access request received by a website, and determine a type of the network access request (operation 102). The system may control the network access request according to the type of the network access request (operation 104).

According to the network access request control method, the system can control the network access request based on the type of the network access request by identifying the network access request received by the website and determining the type of the network access request. The system can then control the network access request according to the type of the network access request. The system can apply different traffic flow control schemes to different levels of the distributed system, guaranteeing the stability and reliability of the distributed system even with high traffic.

User Access Request

Figure 2:
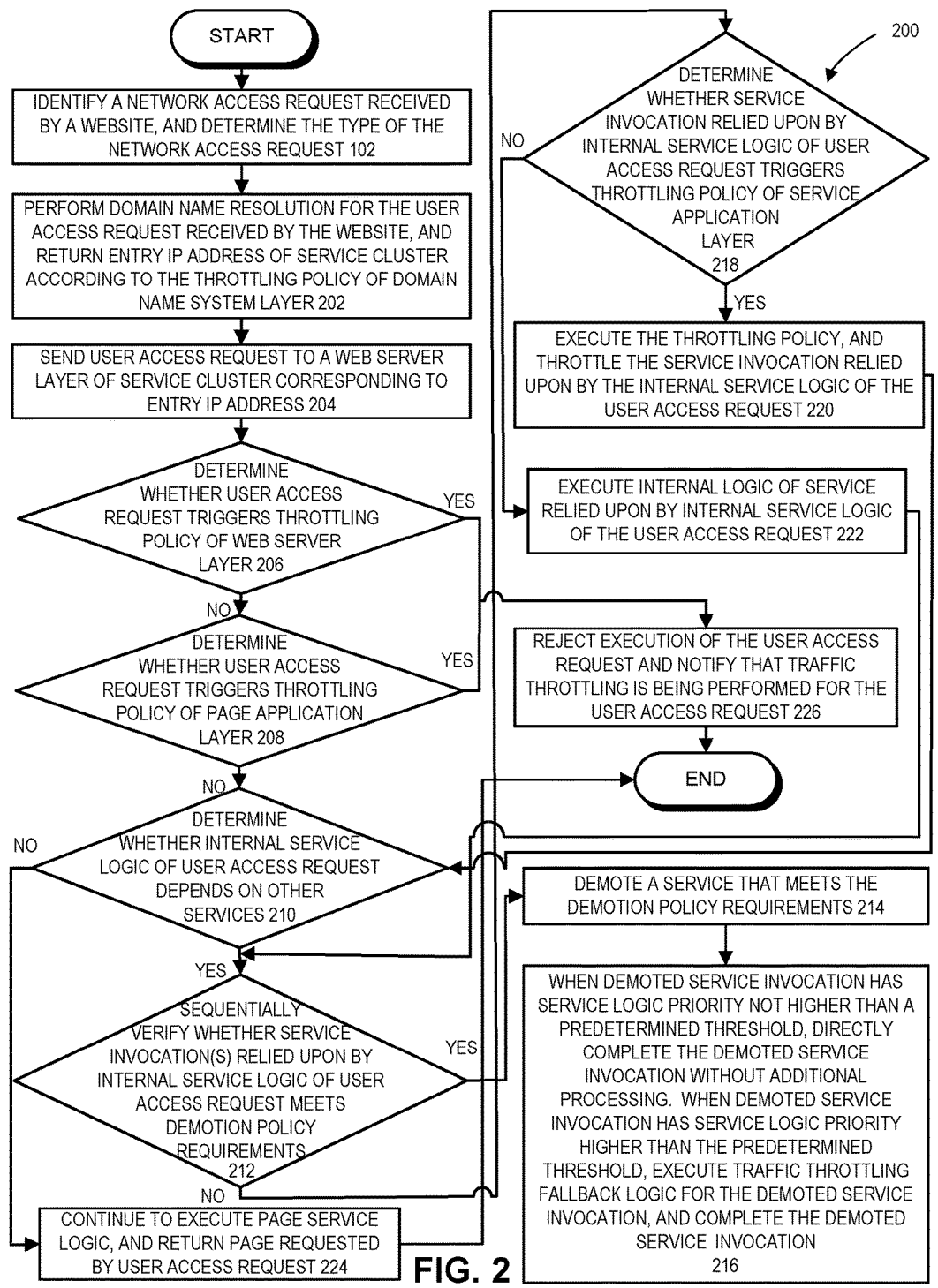
FIG. 2 presents a flowchart illustrating an exemplary process for network access request control with a user access request, in accordance with an embodiment of the present invention.

FIG. 2 presents a flowchart illustrating an exemplary process 200 for network access request control with a user access request, in accordance with an embodiment of the present invention. In this embodiment, the network access request type is that of a user access request. During operation, the system may initially identify a network access request received by a website, and determine the type of the network access request (operation 102). The system may perform domain name resolution for the user access request received by the website, and return an entry IP address of a service cluster according to the throttling policy of the DNS layer (operation 202).

Specifically, the entry IP address of the service cluster based on the traffic throttling policy of the DNS layer may be as follows: if a traffic throttling threshold of the default service cluster is reached, the system may return the entry IP address of a service cluster other than the default service cluster according to priority settings. If the traffic throttling threshold of the default service cluster is not yet reached, the system may return the entry IP address of the default service cluster.

The traffic throttling threshold of the default service cluster can be automatically configured according to the system performance and/or implementation requirements in actual practice. Embodiments of the present invention are not limited to any specific traffic throttling threshold value for the default service cluster, and the system or administrator may set an appropriate traffic throttling threshold value.

The system may send the user access request to a web server layer of a service cluster corresponding to the entry IP address (operation 204).

The system may determine whether the user access request triggers a traffic throttling policy of the web server layer (operation 206). In response to determining that the user access request triggers a traffic throttling policy of the web server layer, the system may execute operation 226. In response to determining that the user access request does not trigger a traffic throttling policy of the web server layer, the system may execute operation 208.

The system may determine whether the user access request triggers a throttling policy of the page application layer (operation 208). In response to determining that the user access request triggers a throttling policy of the page application layer, the system may execute operation 226. In response to determining that the user access request does not trigger a throttling policy of the page application layer, the system may execute operation 210.

The system may determine whether the internal service logic of the user access request depends on other services (operation 210). In response to determining that the internal service logic of the user access request depends on other services, the system may execute operation 212. In response to determining that the internal service logic of the user access request does not depend on other services, the system may execute operation 224.

The system may then sequentially verify whether one or more service invocations relied upon by the internal service logic of the user access request meets the demotion policy requirements (operation 212). In response to determining that one or more service invocations relied upon by the internal service logic of the user access request meets the demotion policy requirements, the system may execute operation 214. In response to determining that no service invocations relied upon by the internal service logic of the user access request meets the demotion policy requirements, the system may execute operation 218.

The system may then demote a service that meets the demotion policy requirements (operation 214).

When the system determines that the demoted service invocation has service logic priority not higher than a predetermined threshold, the system may respond by directly completing the demoted service invocation without additional processing.

When the system determines that the demoted service invocation has service logic priority higher than the predetermined threshold, the system may respond by executing traffic throttling fallback logic for the demoted service invocation, and completing the demoted service invocation (operation 216). The service logic with priority higher than the predetermined threshold can be the core service logic, and executing the traffic throttling fallback logic for the demoted service invocation may include sending fallback notifications, guaranteeing the distributed transaction and so on.

The system can, in an implementation, automatically configure the predetermined threshold according to the system performance and/or implementation requirements. Embodiments of the present invention not limited to any specific predetermined threshold values, and the system or administrator may set an appropriate threshold value.

The system may determine whether the service invocation relied upon by the internal service logic of the user access request triggers the throttling policy of the service application layer (operation 218). In response to determining that the service invocation relied upon by the internal service logic of the user access request triggers the throttling policy of the service application layer, the system may execute operation 220. In response to determining that the service invocation relied upon by the internal service logic of the user access request does not trigger the throttling policy of the service application layer, the system may execute operation 222.

The system may execute the traffic throttling policy, and throttle invocation of the service relied upon by the internal service logic of the user access request (operation 220). The system may then return to execute operation 210.

The system may execute the internal logic of the service relied upon by the internal service logic of the user access request (operation 222), and then return to execute operation 212.

The system may continue to execute the page service logic, and return the page requested by the user access request (operation 224), and complete the process.

The system may reject execution of the user access request, notify that traffic throttling is being performed for the user access request (operation 226), and complete the process. Notifying that the user access request is being throttled can include redirecting the user access request to a user-friendly traffic throttling notification page.

Furthermore, after operation 222, upon executing the service invocation relied upon by internal service logic of the user access request, the system may determine whether the traffic associated with the internal service logic of the user access request is throttled by the relied service. In response to determining that the traffic associated with the internal service logic of the user access request is throttled by the relied service, the system may execute operation 216. In response to determining that the traffic associated with the internal service logic of the user access request is not throttled by the relied service, the system may execute operation 224.

Crawler Access Request

Figure 3:
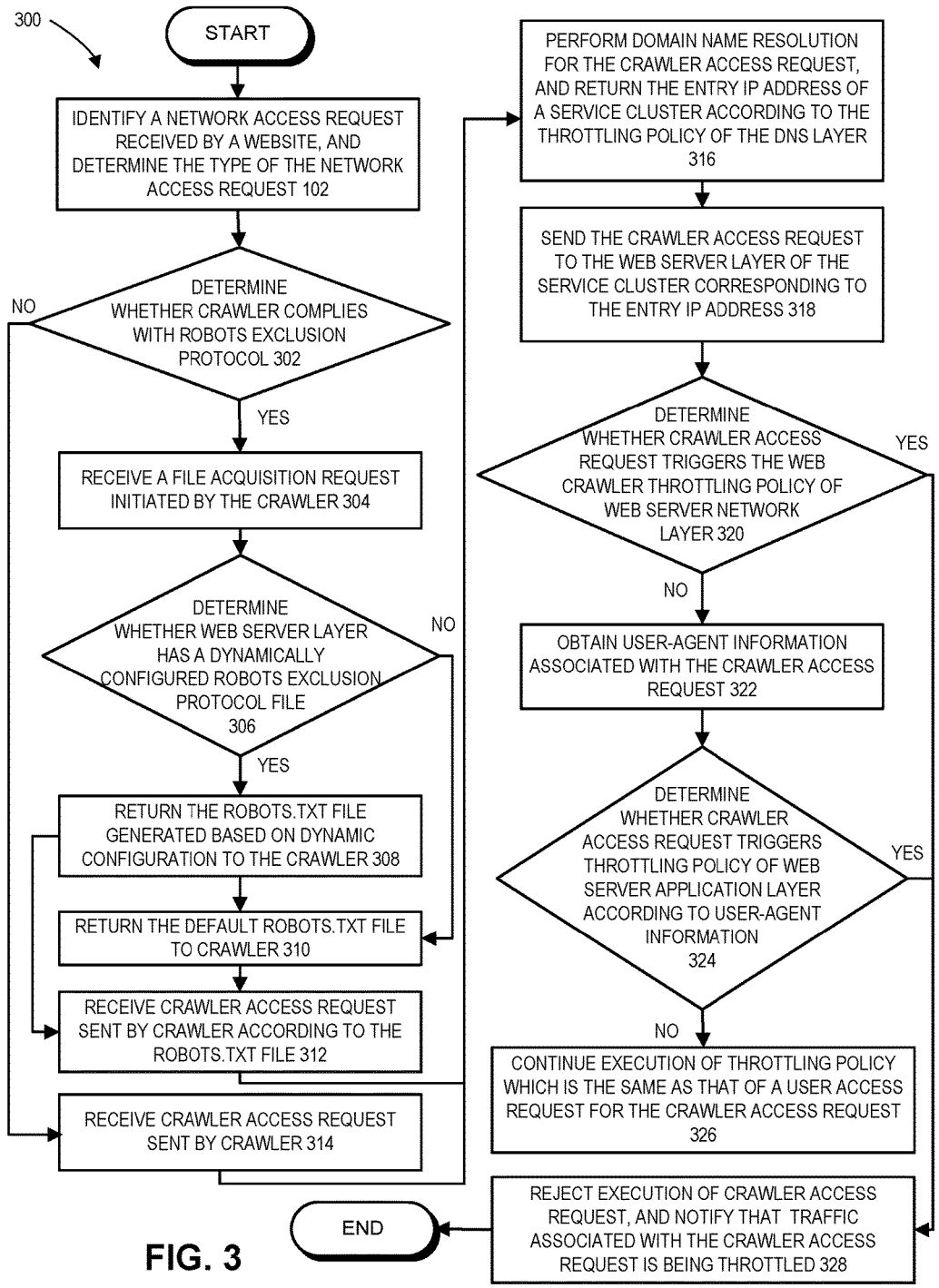
FIG. 3 presents a flowchart illustrating an exemplary process for network access request control with a crawler access request, in accordance with an embodiment of the present invention.

FIG. 3 presents a flowchart illustrating an exemplary process 300 for network access request control with a crawler access request, in accordance with an embodiment of the present invention. As illustrated in FIG. 3, the network access request type can be a crawler access request and operation 104 may include multiple operations described below. During operation, the system may initially identify a network access request received by a website, and determine the type of the network access request (operation 102).

The system may determine whether a crawler associated with the network access request complies with the Robots Exclusion Protocol (operation 302). In response to determining that the crawler associated with the network access request complies with the Robots Exclusion Protocol, the system may execute operation 304. In response to determining that the crawler associated with the network access request does not comply with the Robots Exclusion Protocol, the system may execute operation 314.

The system may receive a file acquisition request initiated by the crawler (operation 304). The file acquisition request can be a request for a Robots Exclusion Protocol text file (e.g., Robots.txt).

The system may determine whether the web server layer has a dynamically configured Robots Exclusion Protocol text file (e.g., Robots.txt) (operation 306). In response to determining that the web server layer has a dynamically configured Robots Exclusion Protocol text file, the system may execute operation 308. In response to determining that the web server layer does not have a dynamically configured Robots Exclusion Protocol text file, the system may execute operation 310.

The system may return the text file (e.g., Robots.txt) generated based on dynamic configuration to the crawler (operation 308), and then execute operation 312.

The system may return the default text file (e.g., Robots.txt) file to the crawler (operation 310), and then execute operation 312.

The system may receive the crawler access request sent by the crawler according to the Robots.txt file (operation 312), and then execute operation 316.

The system may receive the crawler access request sent by the crawler (operation 314), and then execute operation 316.

The system may then perform domain name resolution for the crawler access request, and return the entry IP address of a service cluster according to the throttling policy of the DNS layer (operation 316).

Returning the entry IP address of the service cluster according to the throttling policy of the DNS layer may be as follows: if a traffic throttling threshold of the default service cluster is reached, the system may return the entry IP address of a service cluster other than the default service cluster according to priority settings. If the traffic throttling threshold of the default service cluster is not yet reached, the system may return the entry IP address of the default cluster.

The traffic throttling threshold of the default service cluster can be automatically configured according to system performance and/or implementation requirements in practical application. Embodiments of the present invention not limited to any specific traffic throttling threshold value for the default service cluster, and the system or administrator may set an appropriate traffic throttling threshold value.

The system may send the crawler access request to the web server layer of the service cluster corresponding to the entry IP address (operation 318).

The system may determine whether the crawler access request triggers the web crawler throttling policy of the web server network layer (operation 320). In response to determining that the crawler access request does not trigger the web crawler throttling policy of the web server network layer, the system may execute operation 322. In response to determining that the crawler access request triggers the web crawler throttling policy of the web server network layer, the system may execute operation 328.

The system may obtain user-agent information associated with the crawler access request (operation 322).

The system may determine whether the crawler access request triggers the throttling policy of the web server application layer according to the user-agent information (operation 324). In response to determining that the crawler access request does not trigger the throttling policy of the web server application layer according to the user-agent information, the system may execute operation 326. In response to determining that the crawler access request triggers the throttling policy of the web server application layer according to the user-agent information, the system may execute operation 328.

The system may continue execution of the throttling policy which is the same as that of a user access request for the crawler access request (operation 326). The process of continuing execution of the throttling policy which is the same as that of the user access request for the crawler access request is described with respect to operations 208-226 as shown in FIG. 2.

The system may reject execution of the crawler access request, and notify that the traffic associated with the crawler access request is being throttled (operation 328). Notifying that the traffic associated with the crawler access request is being throttled can include redirecting the crawler access request to a user-friendly traffic throttling notification page.

Invalid Access Request

Figure 4:
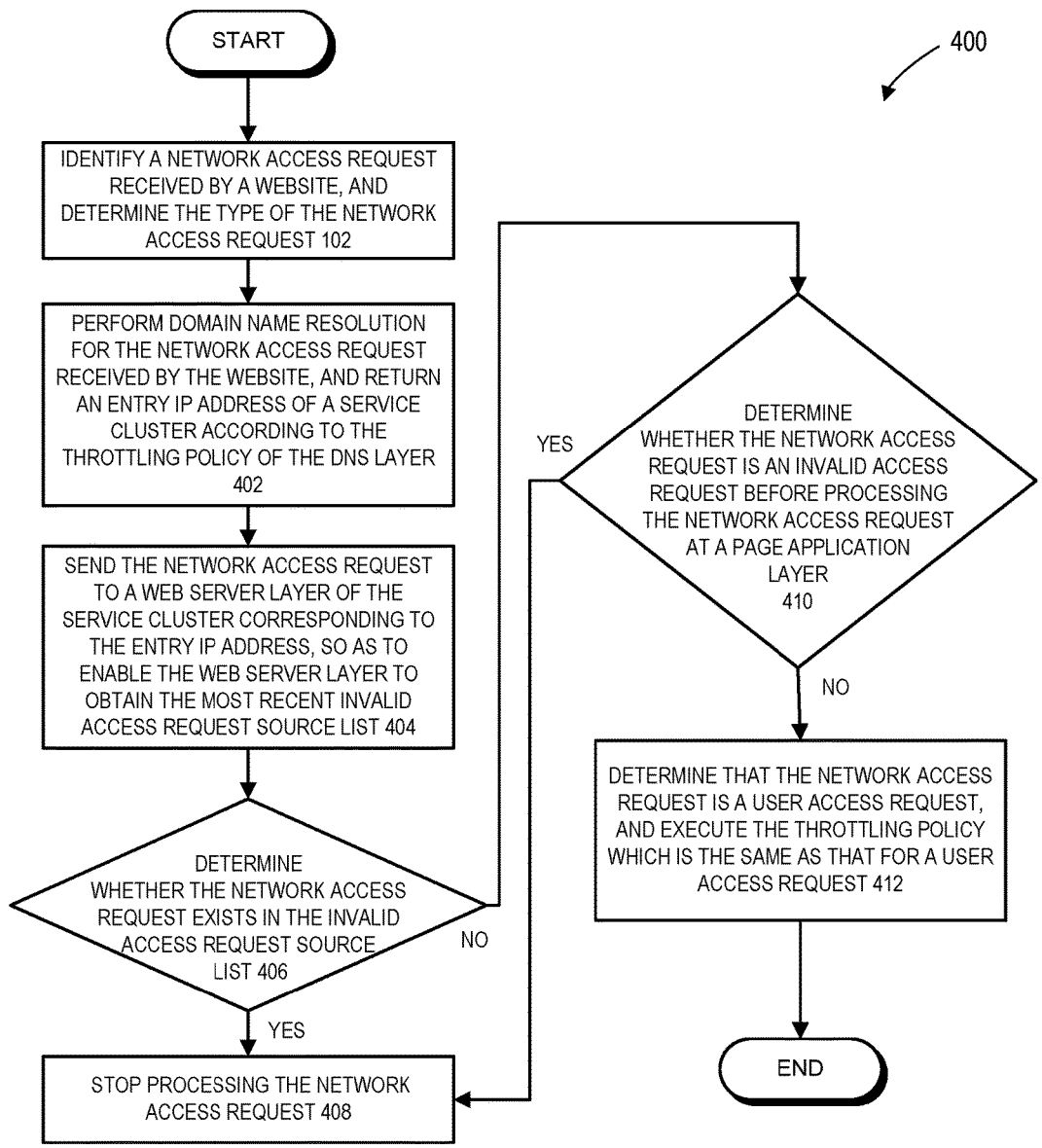
FIG. 4 presents a flowchart illustrating an exemplary process for network access request control with an invalid access request, in accordance with an embodiment of the present invention.

FIG. 4 presents a flowchart illustrating an exemplary process 400 for network access request control with an invalid access request, in accordance with an embodiment of the present invention. In this embodiment, the type of the network access request is that of an invalid access request. As illustrated in FIG. 4, the system may initially identify a network access request received by a website, and determine the type of the network access request (operation 102). The system then performs operation 104 (FIG. 1), which may include the multiple operations illustrated in FIG. 4 and described below.

The system may perform domain name resolution for the network access request received by the website, and return an entry IP address of a service cluster according to the throttling policy of the DNS layer (operation 402).

Returning the entry IP address of the service cluster based on the throttling policy of the DNS layer may be as follows: if a traffic throttling threshold of the default service cluster is reached, the system may return the entry IP address of a service cluster other than the default service cluster according to priority settings. If the traffic throttling threshold of the default service cluster is not yet reached, the system may return the entry IP address of the default service cluster.

The traffic throttling threshold of the default service cluster can be automatically configured according to system performance and/or implementation requirements in practical application. Embodiments of the present invention are not limited to any specific traffic throttling threshold value of the default service cluster, and the system or administrator may set an appropriate traffic throttling threshold value.

The system may send the network access request to the web server layer of the service cluster corresponding to the entry IP address, so as to enable the web server layer to obtain the most recent invalid access request source list (operation 404).

The system may determine whether the network access request exists in the invalid access request source list (operation 406). In response to determining that the network access request exists in the invalid access request source list, the system may execute operation 408. In response to determining that the network access request does not exist in the invalid access request source list, the system may execute operation 410.

The system may stop processing the network access request (operation 408).

The system may determine whether the network access request is an invalid access request before processing the network access request at the page application layer (operation 410). In response to determining that the network access request is an invalid access request, the system may execute operation 408. In response to determining that the network access request is not an invalid access request, the system may execute operation 412.

The system may determine that the network access request is a user access request, and execute a throttling policy which is the same as that for a user access request (operation 412). The system may continue to perform subsequent operations as described with respect to operations 208-226 illustrated in FIG. 2.

FIGS. 2, 3, and FIG. 4 introduces embodiments with different levels of static traffic control systems from three network access request dimensions. The system mainly avoids anticipated problems by dynamically configuring all layers of traffic control configurations. However, in actual application, a sudden increase in network access requests may exceed estimates. Thus, it may be necessary to formulate a preplanned configuration, and the system may dynamically adjust the throttling policy when the system stability seriously exceeds a predetermined threshold. Note that with regard to large e-commerce websites, user traffic is of the highest priority, followed by crawler traffic.

Dynamically Adjusting Throttling Policy

Figure 5:
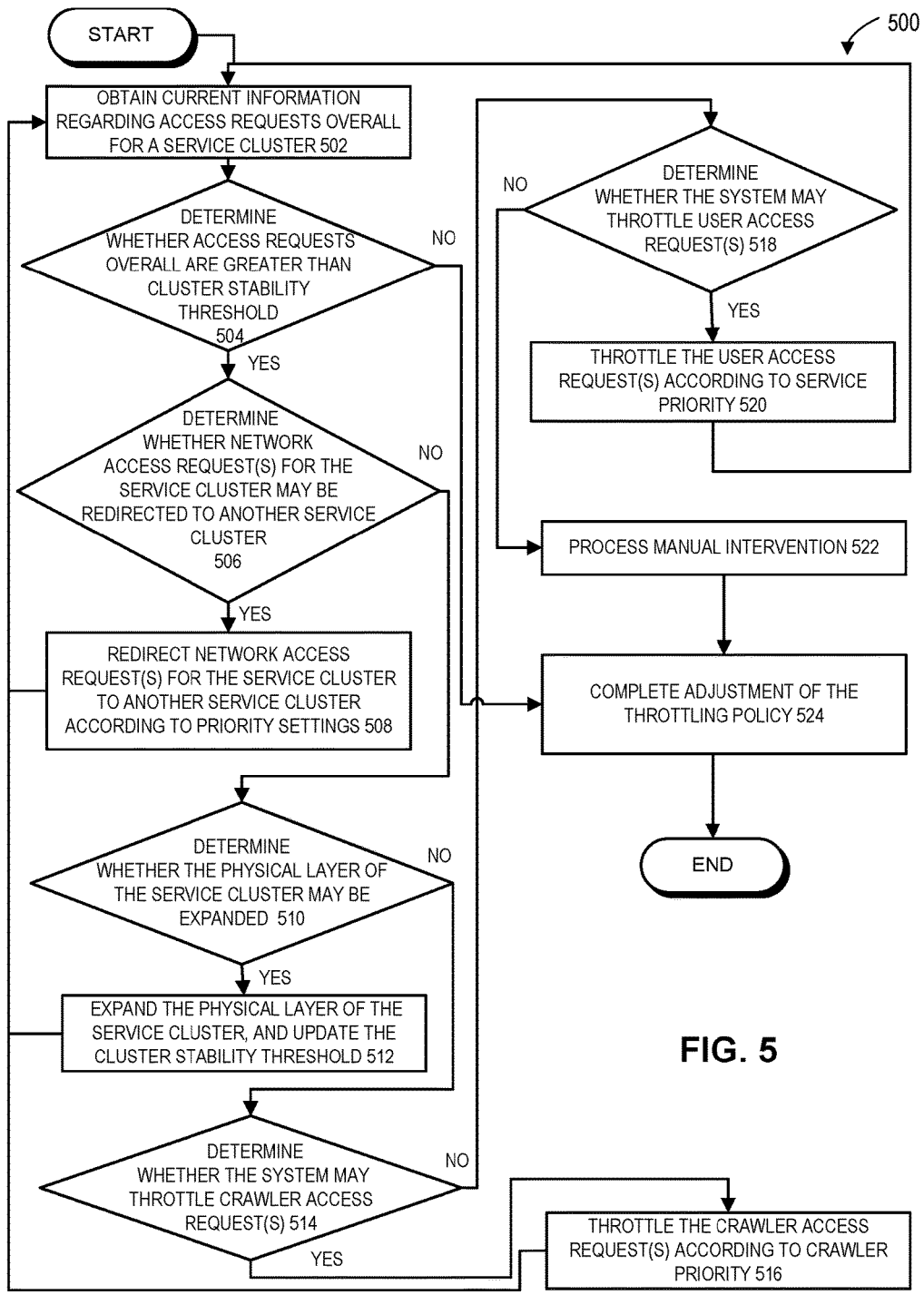
FIG. 5 presents a flowchart illustrating an exemplary process for a network access request control method that dynamically adjusts a throttling policy, in accordance with an embodiment of the present invention.

FIG. 5 presents a flowchart 500 illustrating an exemplary process for a network access request control method that dynamically adjusts a throttling policy, in accordance with an embodiment of the present invention. The system may perform the process of dynamically adjusting the throttling policy before operation 104 (FIG. 1). During operation, the system may perform operations as described below.

The system may obtain current information regarding access requests overall for a service cluster (operation 502).

The system may determine whether the access requests overall are greater than the cluster stability threshold (operation 504). In response to determining that the access requests overall are greater than the cluster stability threshold, the system may execute operation 506. In response to determining that the access requests overall are not greater than the cluster stability threshold, the system may execute operation 524.

In some embodiments, the system may automatically set the cluster stability threshold according to system performance and/or implementation requirements. Embodiments of the present invention are not limited to any particular cluster stability threshold value, and the system or administrator may set an appropriate cluster stability threshold value.

The system may determine whether the network access request(s) for the service cluster may be redirected to another service cluster (operation 506). In response to determining that the network access request(s) for the service cluster may be redirected to another service cluster, the system may perform operation 508, otherwise, the system performs operation 510.

The system may redirect the network access request(s) for the service cluster to another service cluster according to priority settings, and then execute operation 502 (operation 508).

The system may determine whether the physical layer of the service cluster may be expanded (operation 510). In response to determining that the physical layer of the service cluster may be expanded, the system may execute operation 512. In response to determining that the physical layer of the service cluster may not be expanded, the system may execute operation 514.

The system may expand the physical layer of the service cluster, and update the cluster stability threshold (operation 512). The system may then execute operation 502.

The system may determine whether the system may throttle the crawler access request(s) (operation 514). In response to determining that the system may throttle the crawler access request(s), the system may execute operation 516. In response to determining that the system may not throttle the crawler access request(s), the system may execute operation 518.

The system may throttle the crawler access request(s) according to crawler priority (operation 516), and then execute operation 502.

Note that throttling the crawler access request(s) according to crawler priority may include adjusting the traffic control configuration to throttle crawler access request(s) based on crawler priority, in which the crawler priority may be dynamically adjusted according to the priority of an actual service.

The system may determine whether the system may throttle the user access request(s) (operation 518). In response to determining that the system may throttle the user access request(s), the system may execute operation 520. In response to determining that the system may not throttle the user access request(s), the system may execute operation 522.

The system may throttle the user access request(s) according to service priority (operation 520), and then execute operation 502. Note that throttling the user access request(s) according to service priority may include adjusting the URL traffic flow configuration to throttle the user access request(s) according to service priority.

The system may process manual intervention (operation 522), and then execute operation 524.

The system may complete the adjustment of the throttling policy (operation 524).

As shown in FIGS. 2-5, the network access request control method in embodiments of the present invention may divide network access requests using different dimensions and perform fine-grained traffic control based on service priority. The network access request control method also divides the distributed system into different levels, and adopts diverse technical schemes to conduct traffic throttling and demotion that uses the advantages of the different levels. In addition, embodiments of the present invention ensure timeliness and stability by employing unified platform configuration management, static settings and dynamic management, and combining dynamic and static techniques.

Exemplary System Architecture

Figure 6:
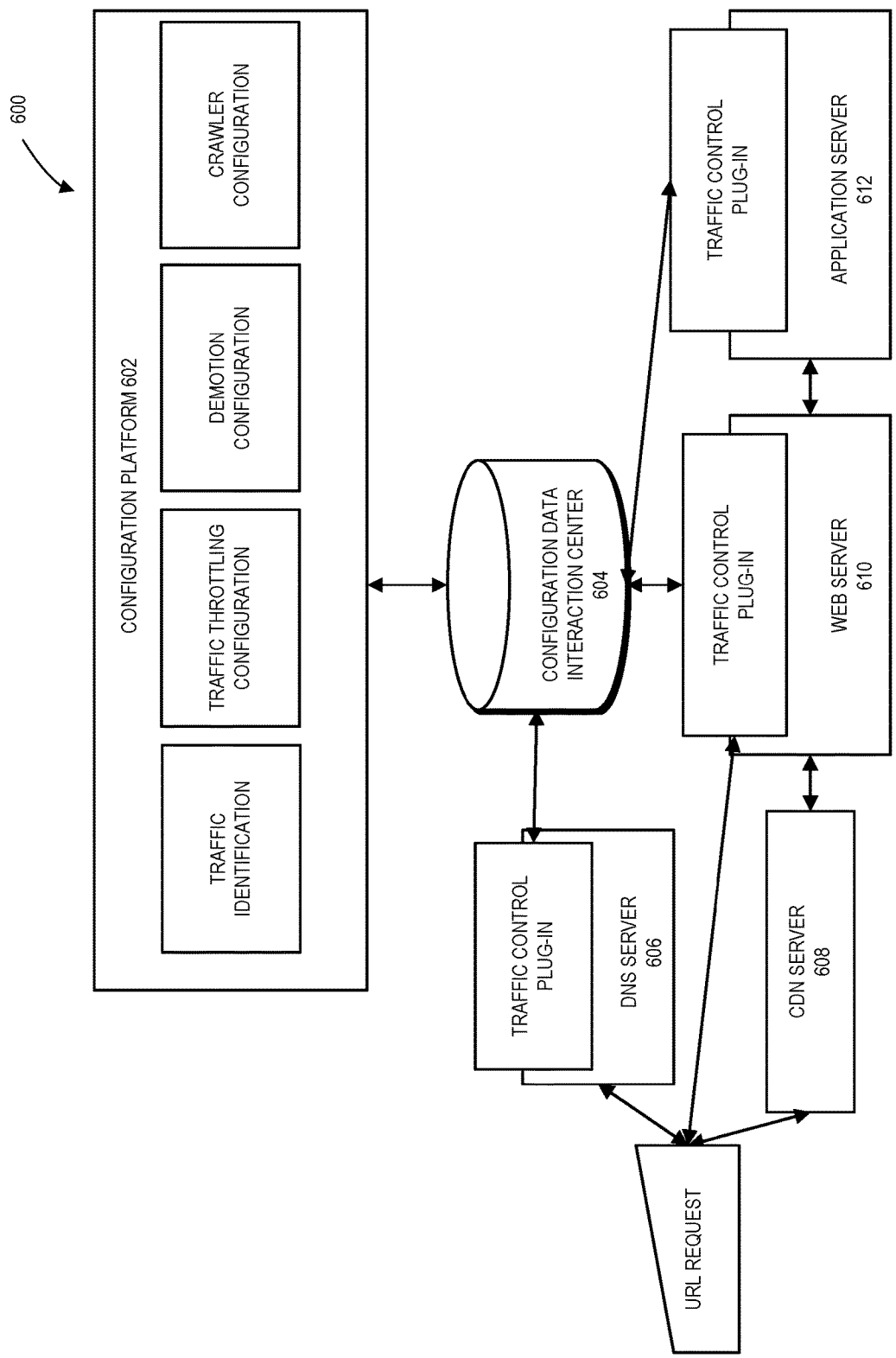
FIG. 6 is a schematic diagram illustrating an exemplary system architecture for performing a network access request control method, in accordance with an embodiment of the present invention.

FIG. 6 is a diagram 600 illustrating an exemplary system architecture for performing a network access request control method, in accordance with an embodiment of the present invention. FIG. 6 illustrates a system architecture that may perform the network access request control methods illustrated in the embodiments of FIGS. 1-5. As shown in FIG. 6, the system architecture may include a configuration platform 602, a configuration data interaction center 604, a DNS server 606, a content delivery network (CDN) server 608, a web server 610 and an application server 612.

Configuration platform 602 has the following main functions: first, a developer may use configuration platform 602 to view all layers of network access requests of the distributed system and dynamically modify the traffic throttling policy. FIG. 5 describes the process of dynamically modifying the traffic throttling policy. The system may exchange configuration data with DNS server 606, web server 610, application server 612, and so on in real time. Second, configuration platform 602 in conjunction with a network access request identification subsystem records the invalid access request sources identified by the subsystem. Third, with respect to crawler configuration functions, the system may set configuration for a true crawler request source identified by the network access request identification subsystem, and store configuration data associated with the crawler request source. Fourth, with respect to traffic throttling configuration functions, the system may configure a URL and/or a service based on queries per second and/or response time.

Configuration data interaction center 604 is a unified exit for configuration platform 602 and is utilized to exchange data with traffic control plug-ins deployed on different servers.

The system may utilize the traffic control plug-ins to perform specific traffic flow control functions. All servers may use the traffic control plug-ins to timely interact with the configuration data interaction center, to obtain the most recent traffic throttling policies.

The system may use CDN server 608 to store static files and user-friendly notification pages that the system redirects to after traffic throttling.

Exemplary Apparatus for Network Access Request Control

Figure 7:
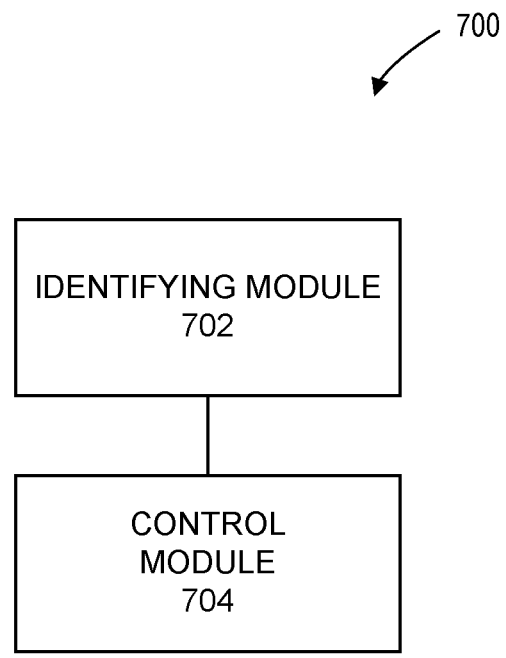
FIG. 7 is a schematic diagram illustrating an exemplary apparatus for network access request control, in accordance with an embodiment of the present invention

FIG. 7 is a schematic diagram illustrating an exemplary apparatus 700 for network access request control, in accordance with an embodiment of the present invention. The apparatus illustrated in FIG. 7 may be implemented at a website and perform operations depicted in FIGS. 1-5. The apparatus of FIG. 7 may include an identifying module 702 and a control module 704. Identifying module 702 may identify a network access request received by a website and determine the type of the network access request. Identifying module 702 in some embodiments may be implemented in the configuration platform of the system architecture of FIG. 6.

Control module 704 may control the network access request according to the type of the network access request determined by identifying module 702. In some embodiments, control module 704 may be a traffic control plug-in for the system architecture of FIG. 6, implemented as part of the DNS server, web server, and/or application server.

With the network access request control apparatus, control module 704 may control the network access request according to the type of the network access request determined by identifying module 702. The system may apply different traffic control schemes to different levels of the distributed system, guaranteeing the stability and reliability of the distributed system even with high traffic.

Exemplary Apparatus System Architecture

Figure 8:
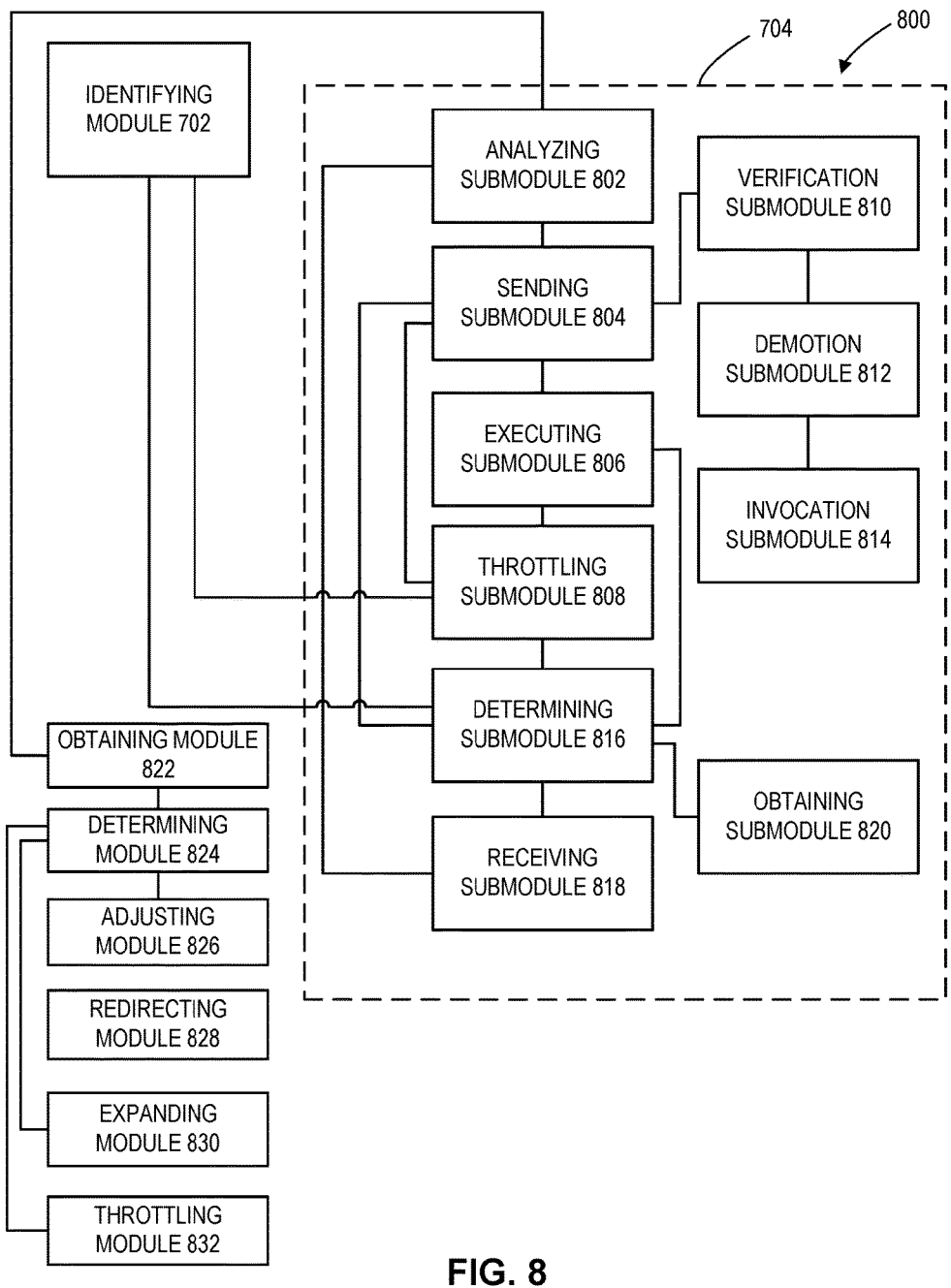
FIG. 8 presents a schematic diagram illustrating an exemplary system architecture for a network access request control apparatus, in accordance with an embodiment of the present application.

FIG. 8 presents a schematic diagram illustrating an exemplary system architecture for a network access request control apparatus 800, in accordance with an embodiment of the present application. Apparatus 800 may include an identifying module 702 and a control module 704. Control module 704 may include an analyzing submodule 802, a sending submodule 804, and an executing submodule module 806.

Analyzing submodule 802 may perform domain name resolution for a user access request received by a website, and return an entry IP address of a service cluster according to the throttling policy of the DNS layer. If (or when) a traffic throttling threshold of the default service cluster is reached, analyzing submodule 802 may return the entry IP address of a service cluster other than the default service cluster according to priority settings. If (or when) the traffic throttling threshold of the default service cluster is not yet reached, analyzing submodule 802 may return the entry IP address of the default service cluster. The traffic throttling threshold of the default service cluster may be automatically configured according to the system performance and/or implementation requirements in actual practice.

Sending submodule 804 may send the user access request to a web server layer of the service cluster corresponding to the entry IP address.

Executing submodule 806 may, when the user access request does not trigger a traffic throttling policy of the web server layer and does not trigger a throttling policy of the page application layer, and the internal service logic of the user access request does not depend on other services, continue to execute the page service logic, and return the page requested by the user access request.

Control module 704 may further include a throttling submodule 808. After sending submodule 804 sends the user access request to a web server layer of the service cluster corresponding to the entry IP address, the user access request may or may not trigger the throttling policy of the Web server layer. However, if the user access request triggers the throttling policy of the page application layer, then throttling submodule 808 may reject execution of the user access request, and notify that traffic throttling is being performed on the user access request.

Control module 704 may further include a verification submodule 810, a demotion submodule 812, and an invocation submodule 814.

Verification submodule 810 may, when the internal service logic of the user access request depends on other services, sequentially verify whether service invocations relied upon by the internal service logic of the user access request meets the demotion policy requirements. Demotion submodule 812 may, when a service invocation relied upon by the internal service logic of the user access request meets the demotion policy requirements, demote a service that meets the demotion policy requirements.

Invocation submodule 814 may, when the demoted service invocation has service logic priority not higher than a predetermined threshold, directly complete the demoted service invocation without additional processing. When the demoted service invocation has service logic priority higher than the predetermined threshold, invocation submodule 814 may execute traffic throttling fallback logic for the demoted service invocation, and complete the demoted service invocation. The service logic with priority higher than the predetermined threshold may be core service logic, and executing the traffic throttling fallback logic for the demoted service invocation may include sending fallback notifications, guaranteeing the distributed transaction and so on. The system may, in an implementation, automatically configure the predetermined threshold according to the system performance and/or implementation requirements.

Control module 704 may further include a determining submodule 816, throttling submodule 808, and executing submodule 806.

Determining submodule 816 may, when the service invocation relied upon by the internal service logic of the user access request does not meet the demotion policy requirements, determine whether the service invocation relied upon by the internal service logic of the user access request triggers the throttling policy of the service application layer.

Throttling submodule 808 may, when the service invocation relied upon by the internal service logic of the user access request triggers the throttling policy of the service application layer, execute the traffic throttling policy, and throttle invocation of the service relied upon by the internal service logic of the user access request.

Executing submodule 806 may, when the service invocation relied upon by the internal service logic of the user access request does not trigger the throttling policy of the service application layer, execute the internal logic of the service relied upon by the internal service logic of the user access request.

In some implementations, identifying module 702 may obtain a network access request that is a crawler access request. Control module 704 includes determining submodule 816, a receiving submodule 818, analyzing submodule 802, sending submodule 804, an obtaining submodule 820, and throttling submodule 808.

Determining submodule 816 may determine whether the crawler complies with the Robots Exclusion Protocol.

Receiving submodule 818 may, when the determining submodule 816 determines that the crawler does not comply with the Robots Exclusion Protocol, receive the crawler access request sent by the crawler.

Analyzing submodule 802 may, when domain name resolution is performed for the crawler access request, return the entry IP address of a service cluster according to the throttling policy of the DNS layer.

Sending submodule 804 may send the crawler access request to the web server layer of the service cluster corresponding to the entry IP address.

Determining submodule 816 may determine whether the crawler access request triggers the web crawler throttling policy of the web server network layer.

Obtaining submodule 820 may, when the determining submodule 816 determines that the crawler access request does not trigger the web crawler throttling policy of the web server network layer, obtain user-agent information associated with the crawler access request.

Determining submodule 816 may, based on the user-agent information associated with the crawler access request obtained by obtaining submodule 820, determine whether the crawler access request triggers the throttling policy of the web server application layer.

Throttling submodule 808 may, when determining submodule 816 determines that the crawler access request does not trigger the throttling policy of the web server application layer, continue execution of the throttling policy which is the same as that of the user access request for the crawler access request.

Furthermore, receiving submodule 818 may also perform operations that include if the crawler complies with the Robots Exclusion Protocol, receiving a file acquisition request initiated by the crawler.

Determining submodule 816 may determine whether the web server layer has a dynamically configured Robots Exclusion Protocol text file.

Sending submodule 804 may, when determining submodule 816 determines that the web server layer has a dynamically configured Robots Exclusion Protocol text file, return the Robots Exclusion Protocol text file (e.g., Robots.txt) generated based on dynamic configuration to the crawler. When determining submodule 816 determines that the web server layer does not have a dynamically configured Robots Exclusion Protocol text file, sending submodule 804 may return the default Robots Exclusion Protocol text file.

Receiving submodule 818 may receive the crawler access request sent by the crawler according to the Robots Exclusion Protocol text file.

Throttling submodule 808 may, when the crawler access request triggers the web crawler throttling policy of the web server network layer, reject execution of the crawler access request, and notify that the traffic associated with the crawler access request is being throttled.

When the crawler access request triggers the throttling policy of the web server application layer, throttling submodule 808 may also reject execution of the crawler access request, and notify that the traffic associated with the crawler access request is being throttled.

In some embodiments, identifying module 702 may determine that a network access request is an invalid access request.

Analyzing submodule 802 may perform domain name resolution for the network access request received by the website, and return the entry IP address of a service cluster according to the throttling policy of the DNS layer.

Sending submodule 804 may send the network access request to the web server layer of the service cluster corresponding to the entry IP address, so as to enable the web server layer to obtain the most recent invalid access request source list.

Control module 704 may also include determining submodule 816 and throttling submodule 808.

Determining submodule 816 may determine whether the network access request exists in the invalid access request source list.

Throttling submodule 808 may stop processing the network access request when determining submodule 816 determines that the network access request exists in the invalid access request source list.

Identifying module 702 may also, when determining submodule 816 determines that the network access request does not exist in the invalid access request source list, determine whether the network access request is an invalid access request before processing the network access request at the page application layer.

Throttling submodule 808 may, when identifying module 702 determines that the network access request is an invalid access request, stop processing the network access request.

When identifying module 702 determines that the network access request is not an invalid access request, and determines that the network access request is a user access request, throttling submodule 808 may execute the throttling policy which is the same as that for the user access request.

Network access request control apparatus 800 may also include an obtaining module 822, a determining module 824, and an adjusting module 826. In some embodiments, obtaining module 822, determining module 824, and/or adjusting module 826 may be implemented in the configuration platform of the system architecture.

Obtaining module 822 may obtain current information regarding access requests overall for a service cluster.

Determining module 824 may determine whether the access requests overall are greater than the cluster stability threshold. In some embodiments, the system may automatically set the cluster stability threshold according to system performance and/or implementation requirements.

Adjusting module 826 may complete the adjustment of the throttling policy when the access requests overall are not greater than the cluster stability threshold.

Network access request control apparatus 800 may also include a redirecting module 828, an expanding module 830, and a throttling module 832. In some embodiments, redirecting module 828, expanding module 830, and throttling module 832 may be implemented within the configuration platform of the system architecture illustrated in FIG. 6.

Determining module 824 may determine whether one or more network access requests for the service cluster may be redirected to another service cluster, when the obtaining module 822 obtains information indicating access requests overall are greater than the cluster stability threshold.

Redirecting module 828 may redirect one or more network access requests for the service cluster to another service cluster according to priority settings, when determining module 824 determines that one or more network access requests for the service cluster may be redirected to another service cluster.

Determining module 824 may determine whether the physical layer of the service cluster may be expanded, when the system determines that a network access request for the service cluster cannot be redirected to another service cluster.

Expanding module 830 may expand the physical layer of the service cluster, and update the cluster stability threshold, when determining module 824 determines that the physical layer of the service cluster may be expanded.

Determining module 824 may also determine whether the system may throttle one or more crawler access requests when the system determines that it cannot expand a physical layer of the service cluster.

Throttling module 832 may throttle one or more crawler access requests according to crawler priority when determining module 824 determines that the system may throttle one or more crawler access requests.

Exemplary Embodiments

Embodiments of the present disclosure include a system for network assess request control. During operation, the system may identify a network access request received by a website. The system may determine a type of the network access request, and control the network access request according to the type of the network access request.

In a variation of this embodiment, the type of the network access request includes a user access request and controlling the network access request according to the type of the network access request includes performing domain name resolution for the network access request received by the website. The system may return an entry IP address of a service cluster according to a traffic throttling policy of a domain name system layer. The system may send the user access request to a web server layer of the service cluster corresponding to the entry IP address.

In a variation of this embodiment, responsive to determining that the user access request does not trigger a throttling policy of the web server layer, and does not trigger a throttling policy of a page application layer, and an internal service logic of the user access request does not rely on other services, the system may continue to execute page service logic, and return a page requested by the user access request.

In a further variation, returning an entry IP address of a service cluster according to a traffic throttling policy of a domain name system layer further includes responsive to determining that a traffic throttling threshold of a default service cluster is reached, the system may return an entry IP address of a service cluster other than the default service cluster according to priority settings. Responsive to determining that the traffic throttling threshold of the default service cluster is not yet reached, the system may return the entry IP address of the default service cluster.

In a further variation, after sending the user access request to a web server layer of the service cluster corresponding to the entry IP address, the system may determine that the user access request triggers a throttling policy of the page application layer. The system may reject execution of the user access request, and notify that traffic throttling is being performed on the user access request.

In a further variation, after sending the user access request to the web server layer of the service cluster corresponding to the entry IP address, and before continuing to execute page service logic and returning the page requested by the user access request, the system may perform additional operations that includes determining that the internal service logic of the user access request depends on other services. The system may sequentially verify whether one or more service invocations relied upon by the internal service logic of the user access request meets demotion policy requirements. Responsive to determining that a service invocation relied upon by the internal service logic of the user access request meets the demotion policy requirements, the system may demote a service that meets the demotion policy requirements. Responsive to determining that a demoted service invocation has service logic priority not higher than a predetermined threshold, the system may directly complete the demoted service invocation without additional processing. Responsive to determining that the demoted service invocation has service logic priority higher than the predetermined threshold, the system may execute traffic throttling fallback logic for the demoted service invocation, and complete the demoted service invocation.

In a further variation, after sequentially verifying whether one or more service invocations relied upon by the internal service logic of the user access request meets the demotion policy requirements, the system may perform additional operations. Responsive to determining that a service invocation relied upon by the internal service logic of the user access request does not meet the demotion policy requirements, the system may determine whether the service invocation relied upon by the internal service logic of the user access request triggers a throttling policy of a service application layer. Responsive to determining that the service invocation relied upon by the internal service logic of the user access request triggers the throttling policy of the service application layer, the system may execute the throttling policy, and throttle invocation of a service relied upon by the internal service logic of the user access request. Responsive to determining that the service invocation relied upon by the internal service logic of the user access request does not trigger the throttling policy of the service application layer, the system may execute an internal logic of the service relied upon by the internal service logic of the user access request.

In a variation on this embodiment, the type of the network access request is a crawler access request.

In a further variation, the type of the network access request is an invalid access request.

In a variation on this embodiment, before controlling the network access request according to the type of the network access request, the system may perform additional operations including obtaining current information regarding access requests overall for a service cluster. The system may determine whether the access requests overall are greater than a cluster stability threshold, and responsive to determining that the access requests overall are not greater than the cluster stability threshold, the system may complete an adjustment of a throttling policy.

In a further variation, after determining whether the access requests overall are greater than the cluster stability threshold, the system may perform additional operations that include responsive to determining that the access requests overall are greater than the cluster stability threshold, determining whether a network access request for the service cluster may be redirected to another service cluster. Responsive to determining that the network access request for the service cluster may be redirected to another service cluster, the system may redirect the network access request for the service cluster to another service cluster according to priority settings.

Exemplary Server

Figure 9:
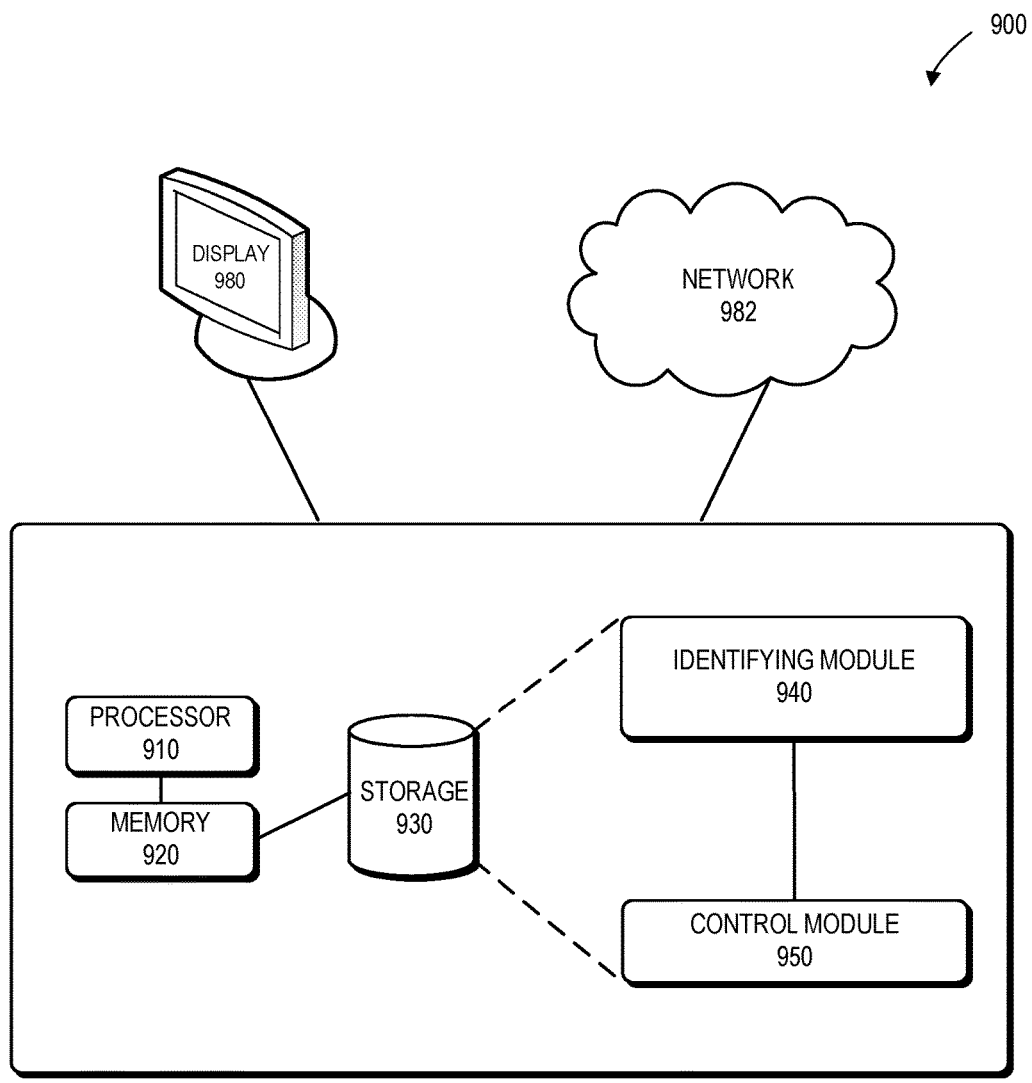
FIG. 9 presents a schematic diagram illustrating an exemplary server for network access request control, in accordance with an embodiment of the present application.

FIG. 9 presents a schematic diagram illustrating an exemplary server for network access request control, in accordance with an embodiment of the present application. Server 900 includes a processor 910, a memory 920, and a storage device 930. Storage 930 typically stores instructions that can be loaded into memory 920 and executed by processor 910 to perform the methods described above. In one embodiment, the instructions in storage 930 can implement an identifying module 940 and a control module 950, which can communicate with each other through various means.

In some embodiments, modules 940-950 can be partially or entirely implemented in hardware and can be part of processor 910. Further, in some embodiments, the server may not include a separate processor and memory. Instead, in addition to performing their specific tasks, modules 940-950, either separately or in concert, may be part of special-purpose computation engines.

Storage 930 stores programs to be executed by processor 910. Specifically, storage 930 stores a program that implements a server (e.g., application) for network access request control. During operation, the application program can be loaded from storage 930 into memory 920 and executed by processor 910. As a result, server 900 can perform the functions described above. Server 900 can further include an optional display 980, and can be coupled via one or more network interfaces to a network 982.

Identifying module 940 may identify a network access request received by a website and determine the type of the network access request.

Control module 950 may control the network access request according to the type of the network access request. Control module 950 may include various components as described with respect to FIGS. 8 and 6, and the components may perform the functions as described herein.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for network access request control, comprising:
   receiving, from a requesting party, a network request to access a webpage;
   determining whether a type of the network request is a user access request type;
   in response to determining that the network request is a user access request type, determining an Internet protocol (IP) address of a service cluster for responding to the network request based on a traffic throttling policy of a domain name system layer;
   sending the network request to a web server layer of the service cluster corresponding to the IP address;
   determining whether the network request triggers a throttling policy of the web server layer;
   in response to determining that the network request triggers a throttling policy of the web server layer, sending a rejection to the requesting party; and
   in response to determining that the network request does not trigger a throttling policy of the web server layer, processing the network request, which involves:
      determining that an internal service logic of the network request depends on other services;
      sequentially verifying whether one or more service invocations relied upon by the internal service logic of the network request meets demotion policy requirements;
      responsive to determining that a first service invocation relied upon by the internal service logic of the network request meets demotion policy requirements, demoting the first service invocation;
      responsive to determining that the demoted first service invocation has service logic priority not higher than a predetermined threshold, directly completing the demoted first service invocation without additional processing; and
      responsive to determining that the demoted first service invocation has service logic priority higher than the predetermined threshold, executing traffic throttling fallback logic for the demoted first service invocation, and completing the demoted first service invocation.

2. The method of claim 1, wherein processing the network request further comprises:
   responsive to determining that the network request does not trigger a throttling policy of a page application layer, and that an internal service logic of the network request does not rely on other services, continuing to execute page service logic, and returning a page requested by the network request.

3. The method of claim 1, wherein determining the IP address of the service cluster further comprises:
   responsive to determining that a traffic throttling threshold of a default service cluster is reached, returning an entry IP address of a service cluster other than the default service cluster according to priority settings; and
   responsive to determining that the traffic throttling threshold of the default service cluster is not yet reached, returning the entry IP address of the default service cluster.

4. The method of claim 1, wherein processing the network request further comprises:
   determining that the network request triggers a throttling policy of a page application layer;
   rejecting execution of the network request; and
   notifying that traffic throttling is being performed for the network request.

5. The method of claim 1, wherein after sequentially verifying whether the one or more service invocations relied upon by the internal service logic of the network request meets the demotion policy requirements, the method further comprises:
   responsive to determining that a second service invocation relied upon by the internal service logic of the network request does not meet the demotion policy requirements, determining whether the second service invocation triggers a throttling policy of a service application layer;
   responsive to determining that the second service invocation triggers the throttling policy of the service application layer, executing the throttling policy, and throttling the second service invocation; and
   responsive to determining that the second service invocation does not trigger the throttling policy of the service application layer, executing an internal logic of the second service invocation.

6. The method of claim 1, further comprising:
   receiving a second network request, wherein the second network request is a crawler access request type.

7. The method of claim 1, further comprising:
   receiving a second network request, wherein the second network request is a is an invalid access request type.

8. The method of claim 1, further comprising:
   obtaining current information regarding access requests overall for a service cluster;
   determining whether the access requests overall are greater than a cluster stability threshold; and
   responsive to determining that the access requests overall are not greater than the cluster stability threshold, completing an adjustment of a throttling policy.

9. The method of claim 8, further comprising:
   responsive to determining that the access requests overall are greater than the cluster stability threshold, determining whether a particular network request for the service cluster may be redirected to another service cluster; and
   responsive to determining that the particular network request for the service cluster may be redirected to another service cluster, redirecting the particular network request for the service cluster to another service cluster according to priority settings.

10. A computing system comprising:
    one or more processors;
    a memory; and
    a non-transitory computer-readable medium coupled to the one or more processors storing instructions stored that, when executed by the one or more processors, cause the computing system to perform a method for network access request control, the method comprising:
    receiving, from a requesting party, a network request to access a webpage;
    determining whether a type of the network request is a user access request type;
    in response to determining that the network request is a user access request type, determining an Internet protocol (IP) address of a service cluster for responding to the network request based on a traffic throttling policy of a domain name system layer;
    sending the network request to a web server layer of the service cluster corresponding to the IP address;

determining whether the network request triggers a throttling policy of the web server layer;
in response to determining that the network request triggers a throttling policy of the web server layer, sending a rejection to the requesting party; and
in response to determining that the network request does not trigger a throttling policy of the web server layer, processing the network request, which involves:
determining that an internal service logic of the network request depends on other services;
sequentially verifying whether one or more service invocations relied upon by the internal service logic of the network request meets demotion policy requirements;
responsive to determining that a first service invocation relied upon by the internal service logic of the network request meets demotion policy requirements, demoting the first service invocation;
responsive to determining that the demoted first service invocation has service logic priority not higher than a predetermined threshold, directly completing the demoted first service invocation without additional processing; and
responsive to determining that the demoted first service invocation has service logic priority higher than the predetermined threshold, executing traffic throttling fallback logic for the demoted first service invocation, and completing the demoted first service invocation.

11. The computing system of claim 10, wherein processing the network request further comprises:
responsive to determining that the network request does not trigger a throttling policy of a page application layer, and that an internal service logic of the network request does not rely on other services, continuing to execute page service logic, and returning a page requested by the network request.

12. The computing system of claim 10, wherein determining the IP address of the service cluster further comprises:
responsive to determining that a traffic throttling threshold of a default service cluster is reached, returning an entry IP address of a service cluster other than the default service cluster according to priority settings; and
responsive to determining that the traffic throttling threshold of the default service cluster is not yet reached, returning the entry IP address of the default service cluster.

13. The computing system of claim 10, wherein processing the network request further comprises:
determining that the network request triggers a throttling policy of a page application layer;
rejecting execution of the network request; and
notifying that traffic throttling is being performed for the network request.

14. The computing system of claim 10, wherein after sequentially verifying whether the one or more service invocations relied upon by the internal service logic of the network request meets the demotion policy requirements, the method further comprises:
responsive to determining that a second service invocation relied upon by the internal service logic of the network request does not meet the demotion policy requirements, determining whether the second service invocation triggers a throttling policy of a service application layer;
responsive to determining that the second service invocation triggers the throttling policy of the service application layer, executing the throttling policy, and throttling the second service invocation; and
responsive to determining that the second service invocation does not trigger the throttling policy of the service application layer, executing an internal logic of the second service invocation.

15. The computing system of claim 10, wherein the method further comprises:
obtaining current information regarding access requests overall for a service cluster;
determining whether the access requests overall are greater than a cluster stability threshold; and
responsive to determining that the access requests overall are not greater than the cluster stability threshold, completing an adjustment of a throttling policy.

16. A non-transitory computer-readable storage medium storing instructions that when executed by a computer cause the computer to perform a method for network access request control, the method comprising:
receiving, from a requesting party, a network request to access a webpage;
determining whether a type of the network request is a user access request type;
in response to determining that the network request is a user access request type, determining an Internet protocol (IP) address of a service cluster for responding to the network request based on a traffic throttling policy of a domain name system layer;
sending the network request to a web server layer of the service cluster corresponding to the IP address;
determining whether the network request triggers a throttling policy of the web server layer;
in response to determining that the network request triggers a throttling policy of the web server layer, sending a rejection to the requesting party; and
in response to determining that the network request does not trigger a throttling policy of the web server layer, processing the network request, which involves:
determining that an internal service logic of the network request depends on other services;
sequentially verifying whether one or more service invocations relied upon by the internal service logic of the network request meets demotion policy requirements;
responsive to determining that a first service invocation relied upon by the internal service logic of the network request meets demotion policy requirements, demoting the first service invocation;
responsive to determining that the demoted first service invocation has service logic priority not higher than a predetermined threshold, directly completing the demoted first service invocation without additional processing; and
responsive to determining that the demoted first service invocation has service logic priority higher than the predetermined threshold, executing traffic throttling fallback logic for the demoted first service invocation, and completing the demoted first service invocation.

17. The non-transitory storage medium of claim 16, wherein after sequentially verifying whether the one or more service invocations relied upon by the internal service logic of the network request meets the demotion policy requirements, the method further comprises:

responsive to determining that a second service invocation relied upon by the internal service logic of the network request does not meet the demotion policy requirements, determining whether the second service invocation triggers a throttling policy of a service application layer;

responsive to determining that the second service invocation triggers the throttling policy of the service application layer, executing the throttling policy, and throttling the second service invocation; and responsive to determining that the second service invocation does not trigger the throttling policy of the service application layer, executing an internal logic of the second service invocation.

18. The non-transitory storage medium of claim 16, wherein the method further comprises:

obtaining current information regarding access requests overall for a service cluster;

determining whether the access requests overall are greater than a cluster stability threshold;

responsive to determining that the access requests overall are not greater than the cluster stability threshold, completing an adjustment of a throttling policy;

responsive to determining that the access requests overall are greater than the cluster stability threshold, determining whether a particular network request for the service cluster may be redirected another service cluster; and responsive to determining that the particular network request for the service cluster may be redirected to another service cluster, redirecting the particular network request for the server cluster to another service cluster according to priority settings.

* * * * *